United States Patent [19]

Whitehead

[11] 3,942,930
[45] Mar. 9, 1976

[54] APPARATUS FOR PRODUCING GRANULES FROM POWDER

[75] Inventor: Eric Whitehead, Newbury, England

[73] Assignee: United Kingdom Atomic Energy Authority, London, England

[22] Filed: Feb. 19, 1975

[21] Appl. No.: 551,114

[30] Foreign Application Priority Data

Mar. 5, 1974 United Kingdom............... 9811/74

[52] U.S. Cl.............. 425/222; 23/313 R; 264/117
[51] Int. Cl.²..................................... B29B 1/02
[58] Field of Search.............. 425/222; 264/117, 37; 23/313 R, 314; 209/288, 241, 240, 370, 322

[56] References Cited
UNITED STATES PATENTS
2,948,948  8/1960  Duplin et al.................. 264/117

FOREIGN PATENTS OR APPLICATIONS
776,982  6/1957  United Kingdom.............. 425/222

*Primary Examiner*—Francis S. Husar
*Assistant Examiner*—Robert J. Charvat
*Attorney, Agent, or Firm*—Larson, Taylor and Hinds

[57] ABSTRACT

Inner and outer cylinders are mounted for rotation about a common horizontal axis. Powder is fed into one end of the inner cylinder to produce granules by coagulation as the cylinder rotates. The inner cylinder is open at the other end to provide an outlet for the granules, and has a perforated (mesh) wall portion towards its outlet end through which uncoagulated powder falls into the outer cylinder. The diameter of the latter increases towards the inlet end of the inner cylinder so that the uncoagulated powder travels back down the surface of the outer cylinder as it rotates. On reaching the end thereof adjacent the inlet end of the inner cylinder, the powder is lifted by scoops on the inner surface of the outer cylinder to fall into an open-topped duct by which powder is fed into the inner cylinder.

3 Claims, 2 Drawing Figures

APPARATUS FOR PRODUCING GRANULES FROM POWDER

BACKGROUND OF THE INVENTION

This invention relates to apparatus for producing granules from powder.

It is known to produce granules from powder by introducing the powder, mixed where appropriate with a suitable binder, into a drum having a smooth inner surface and which is rotated about a horizontal axis. The tumbling action of the drum on the powder causes the powder to coagulate into granules which, under suitable conditions, can be approximately spherical.

Normally such apparatus is used to process the powder batchwise. It is an object of the present invention to provide a form of apparatus which is more suitable for continuous operation.

SUMMARY OF THE INVENTION

According to the present invention apparatus for producing granules from powder comprises:

inner and outer cylinders mounted for rotation about an at least approximately horizontal axis and means for introducing powder into one end of said inner cylinder to produce granules by coagulation of said powder as said inner cylinder rotates;

said inner cylinder having an outlet at its other end for granules to pass out thereof and including towards said other end a perforated wall portion for allowing uncoagulated powder, but not granules, to fall therethrough;

said outer cylinder having a diameter which decreases from said one end to said other end of said inner cylinder whereby powder may fall through said perforated wall portion into said outer cylinder and travel back over the inner surface thereof to its large-diameter end as it rotates;

and means operable by the rotation of said outer cylinder for feeding powder which reaches said large-diameter end back into said one end of the inner cylinder.

The feeding means operable by the rotation of the outer cylinder may comprise vanes or scoops secured to the inner surface thereof and adapted, as the outer cylinder rotates, to raise the powder whereby it may flow from said vanes or scoops under gravity into said one end of the inner cylinder.

The means for introducing powder into said one end of said inner cylinder may comprise an inclined stationary duct which projects into said one end. The duct may comprise an open-topped portion located to receive powder which flows from said vanes or scoops under gravity.

The stationary duct may be sealed to the large-diameter end of the outer cylinder by a rubbing seal.

The inner cylinder may include one or more inwardly projecting weirs to increase the powder hold-up within the inner cylinder.

DESCRIPTION OF THE DRAWINGS

To enable the nature of the present invention to be more readily understood, attention is directed, by way of example, to the accompanying drawings wherein.

DESCRIPTION OF THE PREFERRED EMBODIMENT

Figure 1:
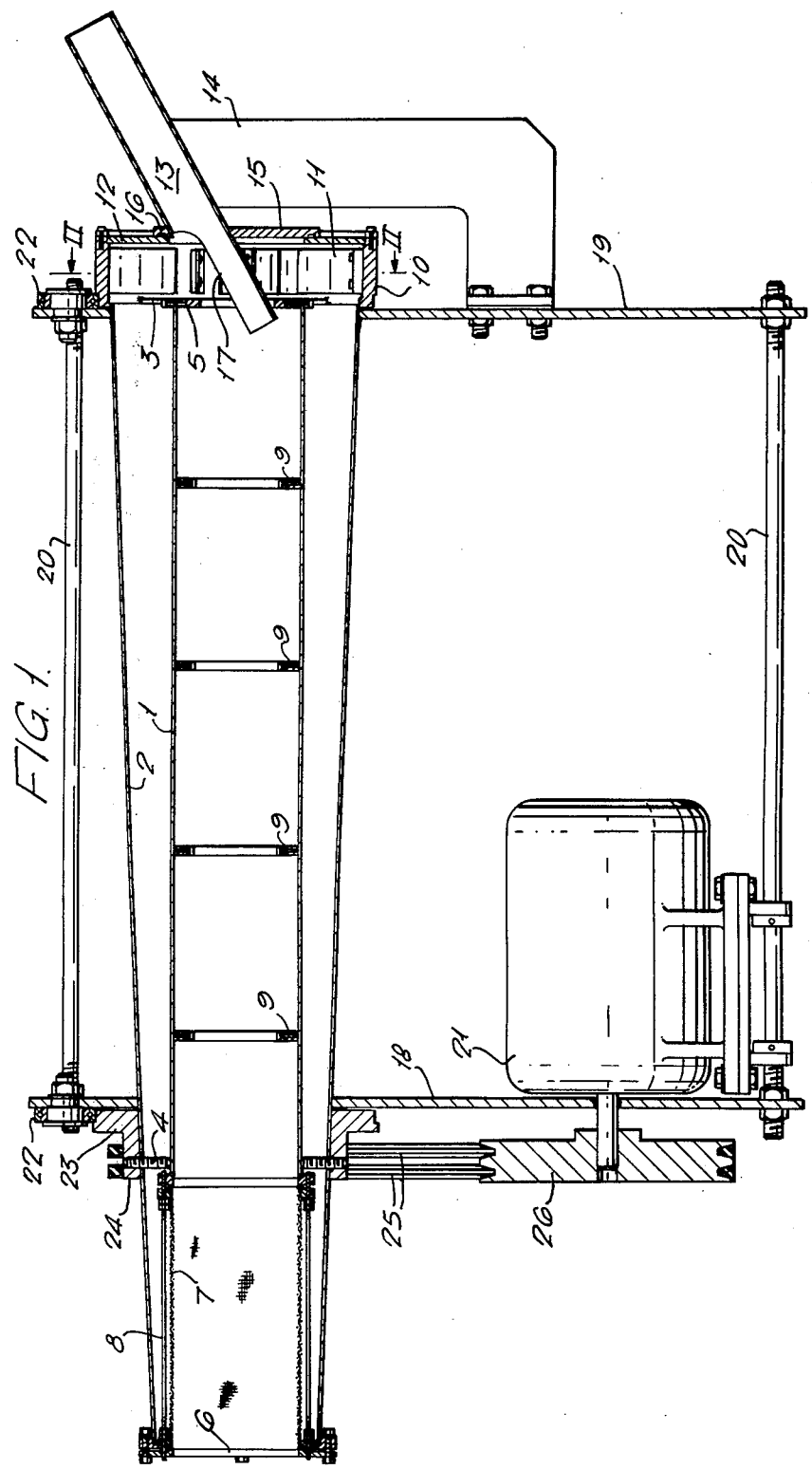
FIG. 1 is a sectional elevation of apparatus embodying the present invention.
Figure 2:
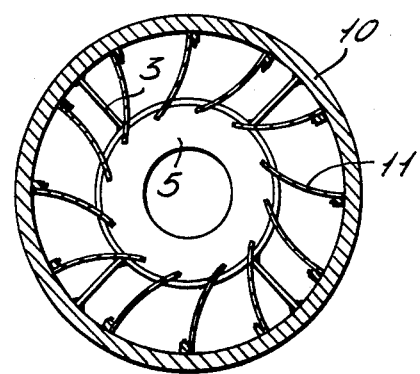
FIG. 2 is a simplified section on the line II—II in FIG. 1.

FIG. 1 shows an inner cylinder 1 and an outer cylinder 2 mounted to rotate together about their common horizontal axis. Cylinder 1 is mounted within cylinder 2 by means of a four-arm spider 3 (see also FIG. 2) and four locating pillars 4. One end of cylinder 1 is terminated by an inwardly projecting lip 5. The other end is open at 6, but preceding end 6 a wall portion 7 of cylinder 1 is formed of wire mesh supported by four rods 8. Spaced apart along the remaining inner wall surface of cylinder 1 are four weirs 9.

Cylinder 2 surrounds cylinder 1 and decreases in diameter towards end 6 of the latter. The large-diameter end of cylinder 2 terminates in a portion 10 which extends beyond lip 5. To the inner surface of portion 10 are secured twelve curved vanes or scoops 11 (see also FIG. 2). Portion 10 is closed by a glass plate 12 having a central hole through which passes an inclined duct 13 which extends into cylinder 1 and is supported by a bracket 14. Duct 13 is sealed through a circular plate 15 which bears on plate 12 via a rubbing seal 16. The portion of duct 13 which extends through plate 15 and into cylinder 1 is open-topped as shown at 17.

Cylinders 1 and 2 are mounted for rotation about their common axis in a frame which comprises end-plates 18 and 19 spaced apart by four rods 20. On the lower pair of rods 20 is mounted an electric motor 21. Bracket 14 is mounted on end-plate 19. Each end-plate includes a large clearance hole in which cylinder 2 is free to rotate. Each end-plate carries three bearings 22 spaced 120° apart round the clearance hole which support and locate the cylinders. At the large-diameter end of cylinder 2, the three bearings 22 on plate 14 contact the outer surface of portion 10. Towards the small-diameter end of cylinder 2 is secured a collar 23 which is contacted by the three bearings 22 on plate 18. Collar 23 includes a pulley-portion 24 which carries driving belts 25 for rotating the cylinders by means of motor 21 and pulley 26.

In use the powder to be granulated, mixed if necessary with a suitable binder in a known manner, is introduced into cylinder 1 via duct 13. As the cylinders rotate, the powder gradually travels towards end 6 of cylinder 1, the action of the smooth inner surface of its wall and the tumbling of the powder causing the latter to coagulate into granules in a familiar manner. The weirs 9 increase the hold-up and hence the residence-time of the powder in the cylinder. In some applications the weirs may be omitted however. The granules travel over the perforated wall of wire-mesh portion 7 and pass out through end 6 to be collected beyond it. Any uncoagulated powder falls through portion 7 into cylinder 2 and thereafter travels down its inclined rotating surface to portion 10. In portion 10 this returning powder is lifted by the vanes or scoops 11 and falls therefrom into the open-topped portion 17 of duct 13 to be re-introduced into cylinder 1.

Although the dimensions are not critical, the drawings are approximated to scale and in one example, for use with uranium oxide powder, cylinder 1 (excluding portion 7) is approximately 30 inches long. Portion 7 is made of woven wire gauze, double crimped, 100 mesh.

I claim:

1. Apparatus for producing granules from powder, the apparatus comprising inner and outer cylinders mounted for rotation about an at least approximately horizontal axis and means for introducing powder into one end of said inner cylinder to produce granules by coagulation of said powder as said inner cylinder rotates, said inner cylinder having an outlet at its other end for granules to pass out thereof and including towards said other end a perforated wall portion for allowing uncoagulated powder but not granules to fall therethrough, and said outer cylinder having a diameter which decreases from said one end to said other end of said inner cylinder whereby powder may fall through said perforated wall portion into said outer cylinder and travel back over the inner surface thereof to its large-diameter end as it rotates, and means operable by the rotation of said outer cylinder for feeding powder which reaches said large-diameter end back into said one end of the inner cylinder.

2. Apparatus for producing granules from powder as claimed in claim 1 wherein the feeding means operable by the rotation of the outer cylinder comprises vanes or scoops secured to the inner surface thereof and adapted, as the outer cylinder rotates, to raise the powder whereby it may flow from said vanes or scoops under gravity into said one end of the inner cylinder.

3. Apparatus for producing granules from powder as claimed in claim 2 wherein the means for introducing powder into said one end of said inner cylinder comprises an inclined stationary duct which projects into said one end and the duct has an open-topped portion located to receive powder which flows from said vanes or scoops under gravity.

* * * * *